April 17, 1962 H. M. GEYER 3,029,659
SYNCHRONIZED ACTUATOR
Filed May 18, 1960 2 Sheets-Sheet 1

INVENTOR.
Howard M. Geyer
BY
*W. E. Finken*
His Attorney

April 17, 1962  H. M. GEYER  3,029,659
SYNCHRONIZED ACTUATOR
Filed May 18, 1960  2 Sheets-Sheet 2

INVENTOR.
Howard M. Geyer
BY
W. E. Finken
His Attorney

United States Patent Office 3,029,659
Patented Apr. 17, 1962

3,029,659
SYNCHRONIZED ACTUATOR
Howard M. Geyer, Dayton, Ohio, assignor to General Motors Corporation, Detroit, Mich., a corporation of Delaware
Filed May 18, 1960, Ser. No. 29,901
8 Claims. (Cl. 74—409)

This invention pertains to power transmitting devices, and particularly to an improved hydraulic actuator designed for synchronous operation with other like actuators.

In my prior Patent No. 2,657,539, a hydraulic actuator designed for synchronous operation with other like actuators is disclosed comprising a cylinder having a reciprocable piston therein, the piston being operatively connected to a screw shaft such that piston movement imparts rotation to the screw shaft. The screw shafts of adjacent actuators are interconnected by a suitable drive shaft so as to mechanically synchronize the movement of the several actuators. The present invention relates to an improved synchronized actuator assembly wherein backlash is substantially eliminated. Accordingly, among my objects are the provision of a fluid pressure operated actuator capable of being synchronized with other like actuators and having substantially no backlash.

The aforementioned and other objects are accomplished in the present invention by preloading the relatively rotatable elements of the actuator to eliminate backlash. Specifically, the improved actuator comprises a cylinder having a reciprocable piston therein capable of fluid pressure actuation in both directions. The piston carries a two-part nut, the parts of which are spaced apart by shim means to offset, or misalign, the internal helical grooves thereof. The nut forms a component of a conventional screw and nut assembly and engages a complementary screw shaft through the intermediary of a plurality of circulating balls. The screw shaft has a centrally arranged through bore which receives a rod having a threaded end. The other end of the rod is rigidly connected to the stationary cylinder. The threaded end of the rod receives a nut, and a suitable thrust bearing assembly is disposed between the nut and the end of the hollow screw shaft for preloading the combined radial and thrust bearing which rotatably supports the screw shaft within the cylinder.

The screw shaft is integral with a worm gear. The worm gear is engaged by a pair of diametrically located worms, one of which is connected to the drive shaft interconnecting adjacent like actuators. The other worm gear is preloaded to eliminate backlash between the worms and the worm gear. In addition, the worms are connected by gearing so as to synchronize their movements.

The improved actuator assembly also includes unidirectional locking means for locking the actuator against movement by external loading in one direction. The locking means can be manually released to permit hydraulic operation of the actuators in opposition to the external load.

Further objects and advantages of the present invention will be apparent from the following description, reference being had to the accompanying drawings, wherein a preferred embodiment of the present invention is clearly shown.

Figure 1:
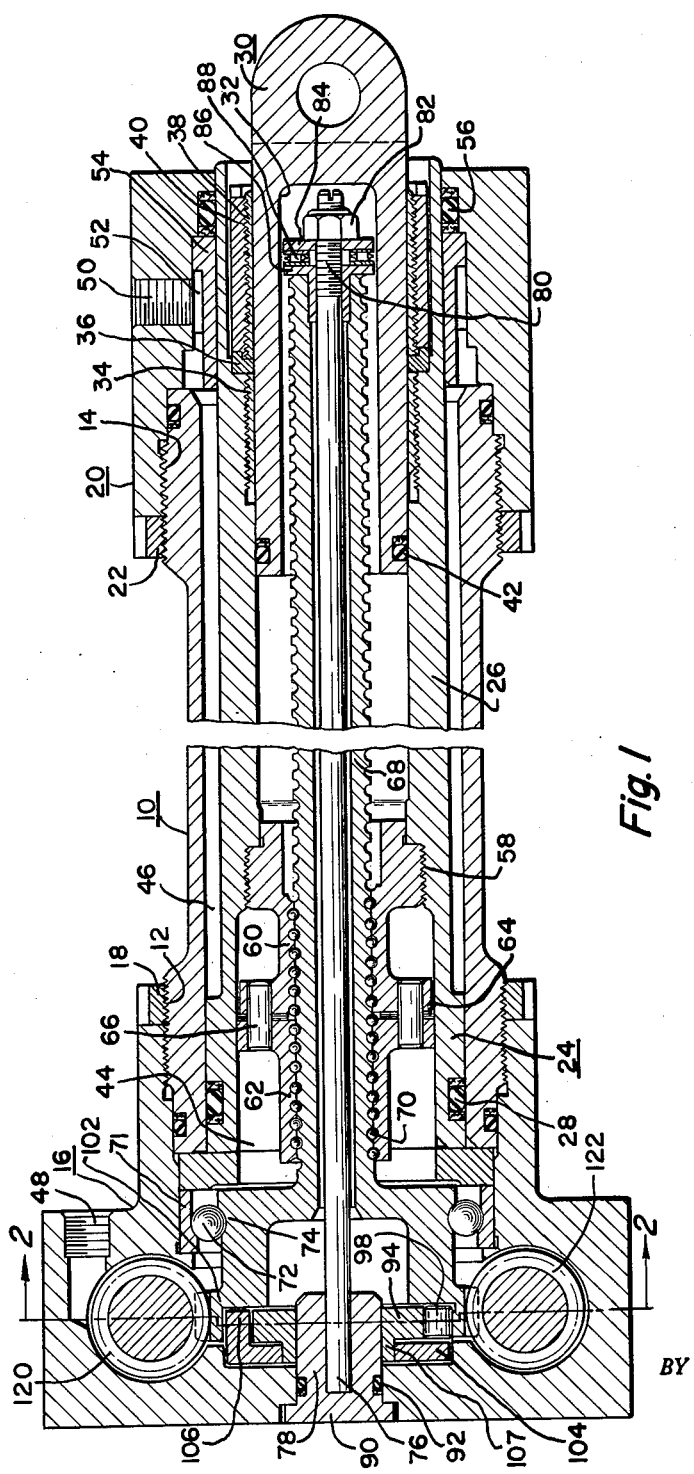
FIGURE 1 is a fragmentary longitudinal sectional view of an actuator constructed according to the present invention.
Figure 3:
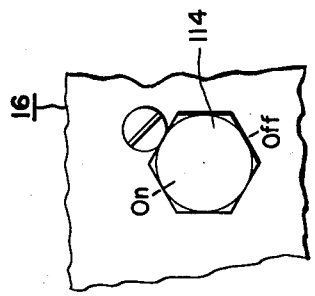
FIGURE 3 is a fragmentary view in elevation taken in the direction of arrow 3 of FIGURE 2.

With particular reference to FIGURE 1, the improved actuator includes a cylinder 10 having externally threaded ends 12 and 14. A head cap 16 engages the threaded end 12 and is locked in assembled relation with the cylinder 10 by a nut 18. A tail cap 20 engages the thread 14 and is locked in assembled relation by a nut 22. A reciprocable piston 24 having an integral hollow rod 26 is disposed within the cylinder 10. The piston head carries a suitable O-ring seal assembly 28. The outer end of the hollow piston rod 26 is closed by a clevis member 30 having a cylindrical recess 32, the purpose of which will be pointed out more particularly hereinafter. The clevis member 30 is attached to the hollow piston rod 26 by an externally threaded sleeve 34 press fitted on the clevis member and engaging a thrust ring 36. A second externally threaded sleeve 38 is likewise press fitted on the clevis member 30 and is engaged by a lock nut 40. The inner end of the clevis member 30 carries a suitable O-ring seal assembly 42.

The cylinder assembly including the cylinder 10 and the end caps 16 and 20 are adapted for attachment to a fixed support. The piston 24 divides the cylinder 10 into an extend chamber 44 and a retract chamber 46. The extend chamber 44 communicates with an extend port 48 in the head cap 16 through which hydraulic fluid can be admitted and drained from the chamber 44. The retract chamber 46 communicates with a retract port 50 in the tail cap 20 through external grooves 52 in a bushing 54 slidably supporting the outer end of the hollow piston rod 26. A suitable O-ring seal assembly 56 is disposed between the outer end of the bushing 54 and the tail cap 20. Accordingly, the piston 24 is movable in either direction upon the application of hydraulic fluid under pressure to one chamber while the opposite chamber is connected to drain.

The piston 24 is restrained against rotation relative to the cylinder 10 by the attachment of the clevis member 30 to a suitable device to be operated. The piston 24 is threadedly connected at 58 to a two-part nut assembly including parts 60 and 62. The parts 60 and 62 are internally helically grooved and are spaced apart by shim means 64 while connected for movement in unison by dowel pins 66. Since the piston 24 is restrained against rotation relative to the cylinder 10, the two-part nut assembly 60 and 62 is likewise restrained against rotation relative to the cylinder 10, and thus constitutes a nonrotatable element. The shim means 64 are employed to offset, or misalign, the internal helical grooves of the two parts so as to eliminate backlash in the ball screw and nut assembly of which the two-part nut is a component. The ball screw and nut assembly also includes a hollow screw shaft, or rotatable member 68, having an external helical groove and a plurality of circulating balls 70 for drivingly interconnecting the two-part nut assembly and the screw shaft 68. The screw shaft 68 is rotatably supported in the head cap 16 by a combined radial and thrust ball bearing assembly including an outer race 71, a plurality of balls 72 and an inner race 74 integral with the screw shaft 68. Since the two-part nut assembly is constrained for reciprocation with the piston 24, reciprocation of the piston imparts rotation to the screw shaft 68.

In order to eliminate backlash between the bearings 71, 72 and 74 and the screw 68, a rod 76 having its outer end rigidly secured to an insert 78 of the head cap 16 extends through the hollow screw shaft 68. The outer end of the rod 76 is threaded at 80 and receives a nut 82. A thrust bearing assembly is interposed between the nut 82 and the outer end of the screw shaft 68 comprising a pair of races 84 and 86 and a plurality of rollers 88. Upon tightening of the nut 82, the combined radial and thrust bearing including balls 72 is preloaded to eliminate backlash between the screw shaft and the cylinder.

Figure 2:
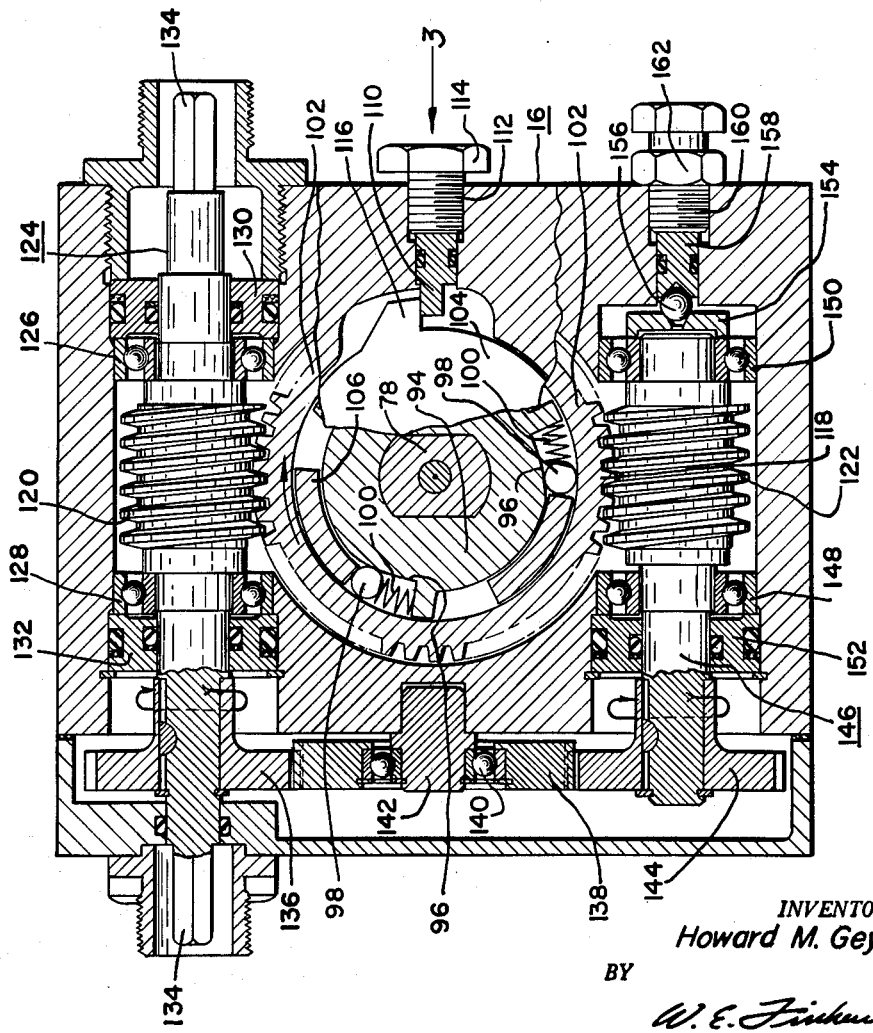
FIGURE 2 is an enlarged sectional view taken along line 2—2 of FIGURE 1, with certain parts broken away.

The insert 78 is restrained against rotation relative to the head cap 16 by having a suitably shaped polygonal head portion 90, and carries an O-ring seal assembly 92. In addition, the insert 78 supports a stationary cam member 94. As seen in FIGURE 2, the cam member 94 has three circumferential notches 96, each of which supports a roller 98 that is urged in one direction by a coil spring 100. The screw shaft 68 has an integral annular flange 102 coaxial with the cam 94 and spaced radially therefrom. An annular lock release member 104 has three axially extending fingers 106 disposed in the annular space between the cam 94 and the annulus 102. The lock release annulus 104 is supported for rotation on a cylindrical hub portion 107 of the stationary cam 94, and is normally biased in the clockwise direction by the springs 100 through the rollers 98 which engage the fingers 106. The cam 94, the rollers 98 and the annulus 100 constitute a one-way clutch, or lock, which, when engaged, prevents rotation of the annulus 100 in the clockwise direction as viewed in FIGURE 2.

In order to release the one-way lock, the lock release annulus 104 is rotated in the counterclockwise direction so that the fingers 106 move the rollers 98 out of wedging engagement between the cutouts 96 and the cam and annulus 102 so as to permit clockwise rotation of the annulus 102. Counterclockwise rotation of the annulus 102 is permitted irrespective of whether the lock is released or engaged.

The one-way lock is adapted to be released by rotation of a transversely arranged cam 110 having a threaded portion 112 engaging the head cap 12 and a hexagonal head 114. The cam 110 can be turned by engaging the hexagonal head 114 with a suitable tool so as to rotate the eccentric portion 110 which is engaged by a radial lug 116 on the lock release annulus 104. The one-way lock is shown in the released position in FIGURE 2.

The annulus 102 is integral with a worm gear 118 which meshes with a pair of diametrically located reversible worms, or rotatable elements, 120 and 122. The worm 120 is integral with a shaft 124 supported by spaced roller bearing assemblies 126 and 128 in the head cap 16. Suitable seal assemblies 130 and 132 are located at opposite ends of the shaft 124, and both ends of the shaft 124 terminate in square drive couplings 134. The square drive couplings 134 are adapted for driving engagement with the flexible drive shafts, not shown, used to interconnect the screw shafts of adjacent actuators which are operated in synchronism with each other.

In addition the shaft 124 has a spur gear 136 drivingly connected therewith, the spur gear 136 engaging a spur gear 138 supported by a bearing 140 on a stub shaft 142. The spur gear 138 engages a spur gear 144 drivingly connected to the shaft 146 of the worm 122. The shaft 146 is journalled in the head cap 16 by spaced ball bearing assemblies 148 and 150, and also has a suitable seal assembly 152 at one end thereof. The other end of the shaft 146 is engaged by a thrust collar 154 having a conical recess within which a thrust ball 156 is seated. The thrust ball 156 also engages a pin 158 which is, in turn, engaged by an externally threaded stud 160 engaging the head cap 16. By rotating the stud 160 the backlash between the worms 120 and 122 and the worm gear 118 can be substantially eliminated. After the stud 160 is adjusted, it is locked in position by a nut 162.

By eliminating backlash in all of the relatively rotatable parts of the synchronizing means, the movements of the several actuators connected thereby can be precisely synchronized. Since the actuator disclosed herein is designed for use in a system wherein the external load acts in only one direction, after the actuators have been moved to the desired position, the cam 110 can be turned to the "off" position wherein the one-way lock is engaged to prevent movement of the actuators by the external load.

While the embodiment of the invention as herein disclosed constitutes a preferred form, it is to be understood that other forms might be adopted.

What is claimed is as follows:

1. An actuator assembly including, a cylinder, a reciprocable piston disposed in said cylinder, a rotatable member disposed in said cylinder and operatively connected to said piston whereby piston movement effects rotation of said member, bearing means rotatably journalling said member in said cylinder, means operable to preload said bearing means to eliminate backlash in the bearing means between said cylinder and said member, a pair of rotatable elements operatively engaging said member so as to be rotated thereby, means drivingly interconnecting said elements, and means acting on one of said elements to preload and to eliminate backlash in the driving connection between said member and said elements.

2. An actuator assembly including, a cylinder, a reciprocable piston disposed in said cylinder, a rotatable member disposed in said cylinder and operatively connected to said piston whereby piston movement effects rotation of said member, a pair of rotatable elements operatively engaging said member so as to be rotated thereby, means drivingly interconnecting said elements, and means acting on one of said elements to preload and to eliminate backlash in the driving connection between said member and said elements.

3. An actuator assembly including, a cylinder, a reciprocable piston disposed in said cylinder, a rotatable member disposed in said cylinder and operatively connected to said piston whereby piston movement effects rotation of said member, a worm gear connected to rotate with said member, a pair of diametrically located worms engageable with said worm gear, means drivingly interconnecting said worms, and means acting on one of said worms to preload and to eliminate backlash in the driving connection between said worm gear and said worms.

4. The actuator assembly set forth in claim 3 wherein the means drivingly interconnecting said worms comprises a gear train.

5. The actuator assembly set forth in claim 3 wherein the means operable to preload one of said worms comprises an adjustable end thrust bearing.

6. An actuator assembly including, a cylinder, a reciprocable piston disposed in said cylinder, a hollow screw shaft disposed in said cylinder and having an operative threaded connection with said piston whereby piston movement effects rotation of said screw shaft, bearing means rotatably journalling said screw shaft in said cylinder comprising a combined radial and thrust bearing assembly, a rod attached to said cylinder and extending through said hollow screw shaft, and means attached to said rod and engageable with the end of said screw shaft for imposing an axial thrust load on said bearing means to eliminate backlash in the bearing means between said cylinder and said screw shaft.

7. The actuator assembly set forth in claim 6 wherein one end of said rod is threaded, and wherein the last recited means comprises a thrust bearing assembly engageable with the end of said screw shaft and a nut engageable with the thrust bearing assembly and threadedly engaging said rod.

8. A preloaded bearing assembly for a screw and nut actuator having a hollow screw shaft rotatably journalled by a combined radial and thrust bearing assembly including, a stationary rod extending through said hollow screw shaft and having a threaded end, a thrust bearing supported on the end of said rod and engageable with the end of said screw shaft, and a nut threadedly engaging said rod and engageable with said thrust bearing for imposing an axial thrust load on said combined radial and thrust bearing assembly to eliminate backlash therein.

References Cited in the file of this patent

UNITED STATES PATENTS

| | | |
|---|---|---|
| 645,463 | Diffenderffer | Mar. 13, 1900 |
| 1,299,593 | Mathias | Apr. 8, 1919 |
| 1,369,442 | Kauffman | Feb. 22, 1921 |
| 2,027,562 | Smith | Jan. 14, 1936 |
| 2,498,897 | Riedel | Feb. 28, 1950 |
| 2,688,951 | Sears | Sept. 14, 1954 |
| 2,765,668 | Milne | Oct. 9, 1956 |
| 2,791,128 | Geyer et al. | May 7, 1957 |
| 2,847,869 | Hogan et al. | Aug. 19, 1958 |
| 2,974,646 | Miller et al. | Mar. 14, 1961 |